United States Patent
Sander et al.

(10) Patent No.: US 7,505,971 B2
(45) Date of Patent: Mar. 17, 2009

(54) SHARED DRIVE THAT PROVIDES SHARED ACCESS TO EDITABLE FILES IN A DATABASE

(75) Inventors: Michael R Sander, Philomath, OR (US); Damien R Forkner, Corvallis, OR (US); LeMoyne F Hadley, Corvallis, OR (US); Jeffrey M Munsey, NE Albany, OR (US); Anne R Pfau, Corvallis, OR (US); Michael L Vanderford, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1211 days.

(21) Appl. No.: 10/186,502

(22) Filed: Jun. 28, 2002

(65) Prior Publication Data
US 2004/0002990 A1    Jan. 1, 2004

(51) Int. Cl.
*G06F 17/00* (2006.01)
*G06F 17/30* (2006.01)

(52) U.S. Cl. .................... 707/9; 707/1; 707/2; 707/10; 707/200; 707/205

(58) Field of Classification Search ............ 707/9, 707/205, 1, 2, 10, 200
See application file for complete search history.

(56) References Cited

U.S. PATENT DOCUMENTS

| | | | | |
|---|---|---|---|---|
| 5,202,982 A * | 4/1993 | Gramlich et al. | ............ | 707/2 |
| 5,535,411 A * | 7/1996 | Speed et al. | ............ | 713/2 |
| 5,706,510 A * | 1/1998 | Burgoon | ............ | 707/203 |
| 5,806,057 A * | 9/1998 | Gormley et al. | ............ | 707/1 |
| 5,812,769 A * | 9/1998 | Graber et al. | ............ | 709/228 |
| 5,832,527 A * | 11/1998 | Kawaguchi | ............ | 707/205 |
| 5,864,853 A * | 1/1999 | Kimura et al. | ............ | 707/10 |
| 5,905,990 A * | 5/1999 | Inglett | ............ | 707/200 |
| 6,088,694 A * | 7/2000 | Burns et al. | ............ | 707/8 |
| 6,094,654 A * | 7/2000 | Van Huben et al. | ............ | 707/8 |
| 6,101,508 A * | 8/2000 | Wolff | ............ | 709/223 |
| 6,321,219 B1 * | 11/2001 | Gainer et al. | ............ | 707/3 |
| 6,571,281 B1 * | 5/2003 | Nickerson | ............ | 709/217 |
| 6,711,686 B1 * | 3/2004 | Barrett | ............ | 709/221 |
| 6,772,139 B1 * | 8/2004 | Smith, III | ............ | 707/3 |
| 6,856,989 B1 * | 2/2005 | Zhou et al. | ............ | 707/9 |
| 6,895,400 B1 * | 5/2005 | Hipp | ............ | 707/1 |
| 6,968,345 B1 * | 11/2005 | Muhlestein | ............ | 707/103 R |
| 6,970,888 B1 * | 11/2005 | Sciarra | ............ | 707/200 |
| 2001/0029507 A1 * | 10/2001 | Nojima | ............ | 707/102 |
| 2002/0049792 A1 * | 4/2002 | Wilcox et al. | ............ | 707/522 |
| 2002/0111942 A1 * | 8/2002 | Campbell et al. | ............ | 707/3 |
| 2003/0051117 A1 * | 3/2003 | Burch et al. | ............ | 711/173 |
| 2003/0093420 A1 * | 5/2003 | Ramme | ............ | 707/3 |
| 2003/0126200 A1 * | 7/2003 | Wolff | ............ | 709/203 |
| 2003/0149696 A1 * | 8/2003 | Nelson et al. | ............ | 707/10 |
| 2004/0068527 A1 * | 4/2004 | Smith, III | ............ | 707/204 |

* cited by examiner

*Primary Examiner*—Don Wong
*Assistant Examiner*—Thanh-Ha Dang (57) ABSTRACT

A system includes a database, a shared drive and a link update routine. The database includes a plurality of files and access information. The access information indicates which users have edit access to which files in the database. The shared drive contains for each user of the shared drive a directory structure that includes symbolic links to files in the database to which the user has edit access. The link update routine scans the access information in the database and updates the symbolic links in the shared drive to take into account changes made to the access information.

14 Claims, 6 Drawing Sheets

SHARED DRIVE THAT PROVIDES SHARED ACCESS TO EDITABLE FILES IN A DATABASE

BACKGROUND OF THE INVENTION

The present invention pertains to access to data in a database and pertains particularly to use of a shared drive that provides shared access to editable files in a database.

Shared drives have been used by small teams to collaboratively work on files prior to publishing. What is meant by a shared drive is a storage entity (such as a hard drive or a matrix of hard drives) to which numerous users have access. For example, several users on separate personal computers (PC) may have access through a local area network (LAN) to a single shared drive.

The use of a shared drive has many advantages. For example, use of shared drives allows file locking and direct editing by each individual of the team. The current revision of a document is automatically accessed by each team member. Also, access to a file on a shared drive via a local area network makes it unnecessary to upload and download copies from a web server.

There are some disadvantages to using a shared drive. For example, only those with shared drive access can view or edit the files. Adding and removing access to a shared drive is typically labor intensive or else control is inadequate. Also, the directory structure in a shared drive is typically uncontrolled and there is limited indexing of, or metadata associated with, the files contained therein. Finally, when web publishing is desired, often the file must be uploaded to the web server as a separate action.

Traditional web publishing systems impose structure and allow for required indexing of files. They also provide worldwide, controlled access if desired. However, most of these systems require that files are uploaded to the server and do not support editing in place nor file locking. Users collaborating on a document must use care that they are working on the most recent revision of a document or risk overwriting changes made by another.

A direct publishing system implemented, for example, with the FrontPage publishing system available from Microsoft Corporation, provides direct web publishing of files on a shared drive. Such a publishing system suffers from access being limited to editing by users with access to the shared drive. Such a publishing system imposes no indexing control on file content and must be implemented with proprietary applications and limited equipment choices.

With all currently available web publishing systems that provide direct editing of published files, control of who can access and edit files is limited. If it is desired that one standard set of team members can edit all files then an existing publishing system may provide an adequate solution. However, if more flexibility is required so that various combinations of users desire control of viewing and editing capabilities, currently available solutions become cumbersome requiring multiple shared drives and multiple access lists.

Another shortcoming in currently available publishing systems that use shared drives is that as files are modified, the history of earlier versions is lost.

SUMMARY OF THE INVENTION

In accordance with the preferred embodiment of the present invention, a system includes a database, a shared drive and a link update routine. The database includes a plurality of files and access information. The access information indicates which users have edit access to which files in the database. The shared drive contains for each user of the shared drive a directory structure that includes symbolic links to files in the database to which the user has edit access. The link update routine scans the access information in the database and updates the symbolic links in the shared drive to take into account changes made to the access information.

DETAILED DESCRIPTION OF THE PREFERRED EMBODIMENT

Figure 1:
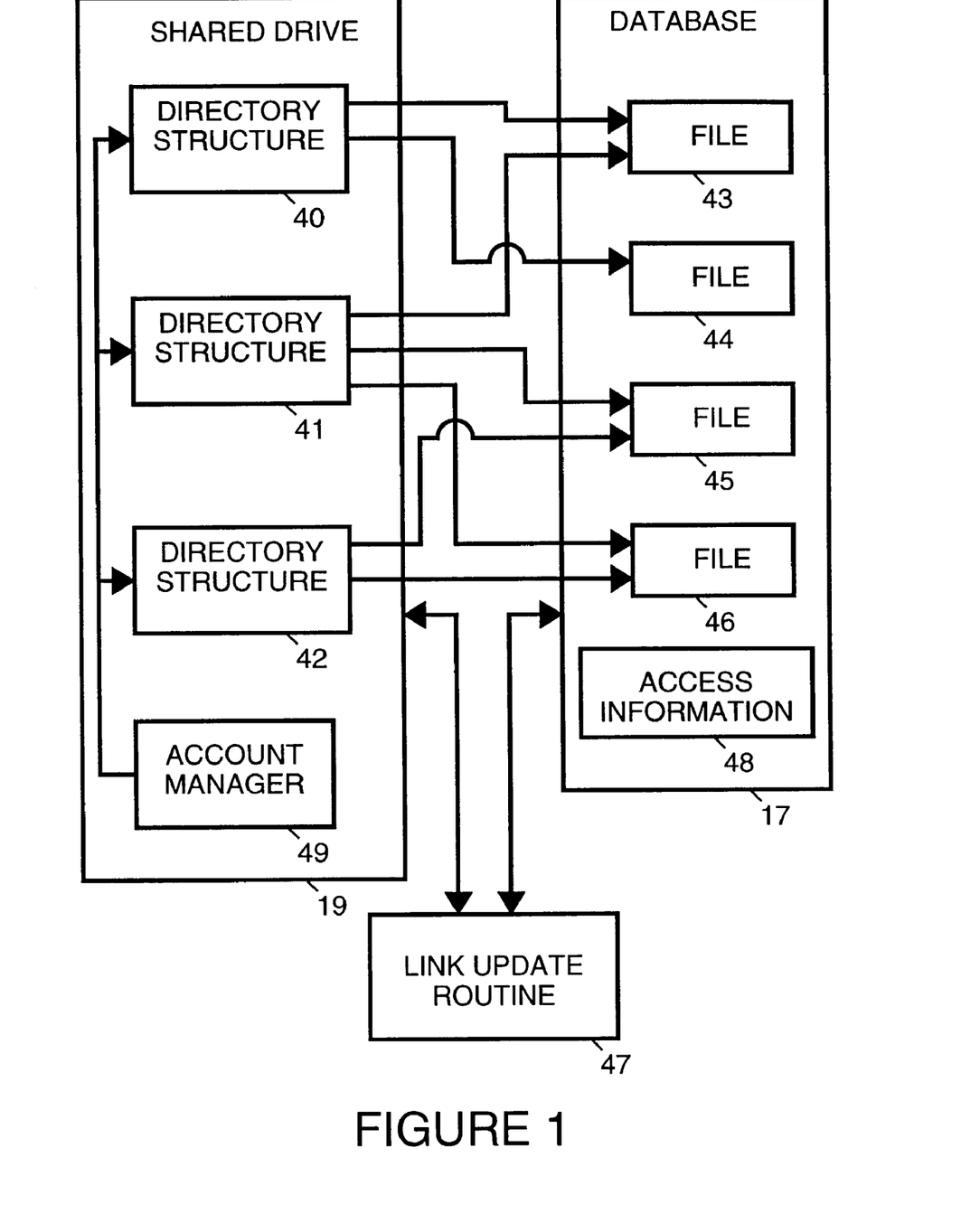
FIG. 1 is a simplified block diagram that illustrates a shared drive that provides shared access to editable files in a database in accordance with an embodiment of the present invention.

FIG. 1 is a simplified block diagram that illustrates a shared drive 19 that provides shared access to editable files in a database 17. The editable files are represented in FIG. 1 by a file 43, a file 44, a file 45 and a file 46.

Shared drive 19 is established using, for example, a shared drive application or operating system capable of sharing files via file system communications. Software applications from a variety of manufacturers may be used to implement shared drives. For example, the Samba software package can be used. Samba is an open source software suite that is used to allow Microsoft, Linux and Unix clients/servers to exchange file and print services with each other.

A file structure of shared drive 19 is programmatically constructed such that each system user of a corresponding file server has a top directory (entry point) on shared drive 19. This is illustrated by a directory structure 40 that has an entry point for a first user, a directory structure 41 that has an entry point for a second user and a directory structure 42 that has an entry point for a third user.

An account manager 49 prevents each user of shared drive 19 from seeing directory structures for other users. The operation of account manager 49 will be discussed in more detail later.

A link update routine 47 periodically scans database 17 to determine from access information 48 to which files within database 17 each user has editable access. Link update routine 47 creates and maintains symbolic links within each directory structure to files for which the corresponding user has editable access. The symbolic links written to shared drive 19 give the appearance that each editable file in the user's directory resides on shared drive 19 while in reality the symbolic link links to the physical location of the file within database 17. The operation of link update routine 47 will be described in more detail later in conjunction with the discussion of FIG. 6.

As can be seen from FIG. 1, the user corresponding to directory structure 40 has editable access to file 43 and file 44 within database 17. The user corresponding to directory structure 41 has editable access to file 43, file 45 and file 46 within database 17. The user corresponding to directory structure 42 has editable access to file 45 and file 46 within database 17. Stored for each file on database 17 is access information 48 that indicates which users have access to that file. Access information 48 can be stored in a central location for all files in database 17. Alternatively, access information pertaining to each file can be stored with the file. For example, the access information 48 indicates what kind of access is granted for each file. The kinds of access include read access and edit access.

To each user, the corresponding directory structure on shared drive 19 appears as a virtual drive mapped to their computing system. This is illustrated by FIG. 2.

Figure 2:
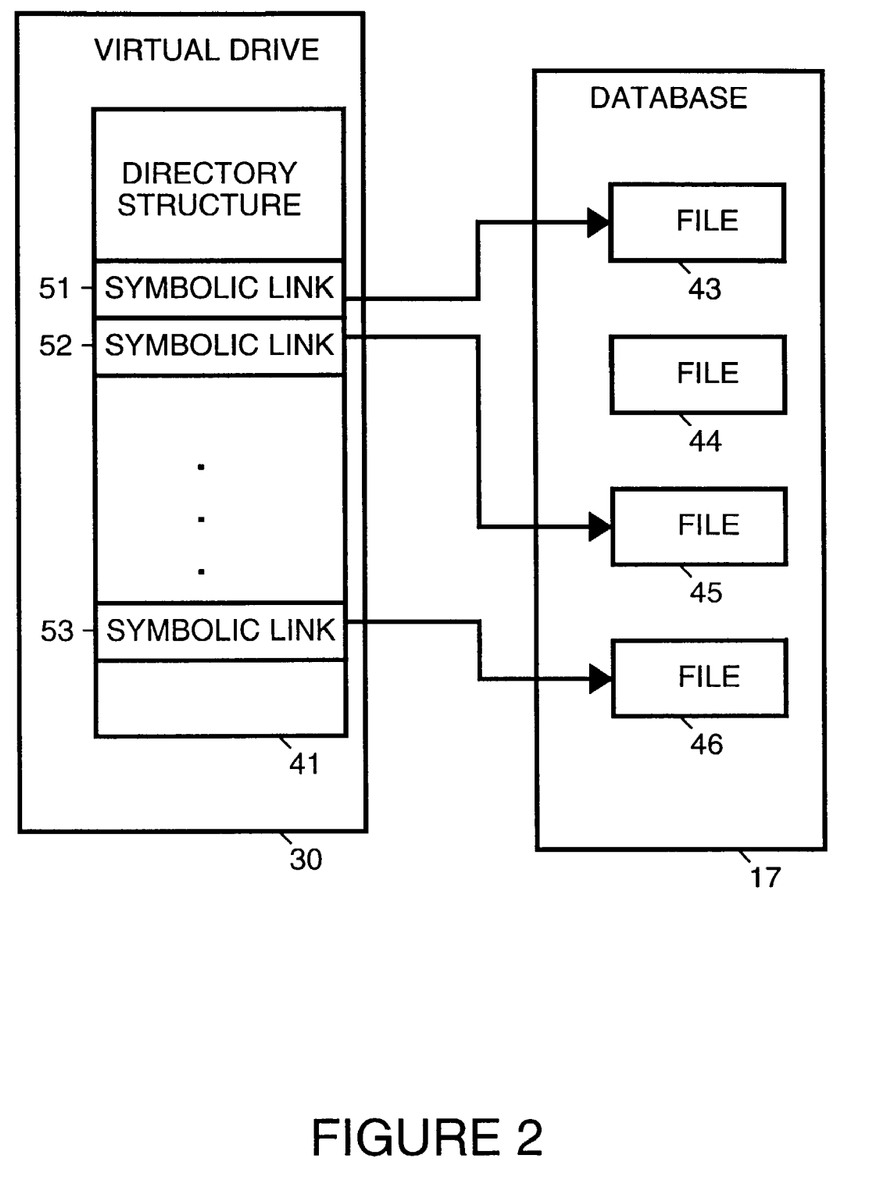
FIG. 2 is a simplified block diagram that illustrates interaction between a virtual drive and a related database in accordance with an embodiment of the present invention.

FIG. 2 shows a virtual drive 30 mapped to the user corresponding to directory structure 41. As seen by the user, virtual drive 30 includes directory structure 41. Within directory structure 41, a symbolic link 51 links to file 43 within database 17, a symbolic link 52 links to file 45 within database 17, a symbolic link 53 links to file 46 within database 17.

Figure 3:
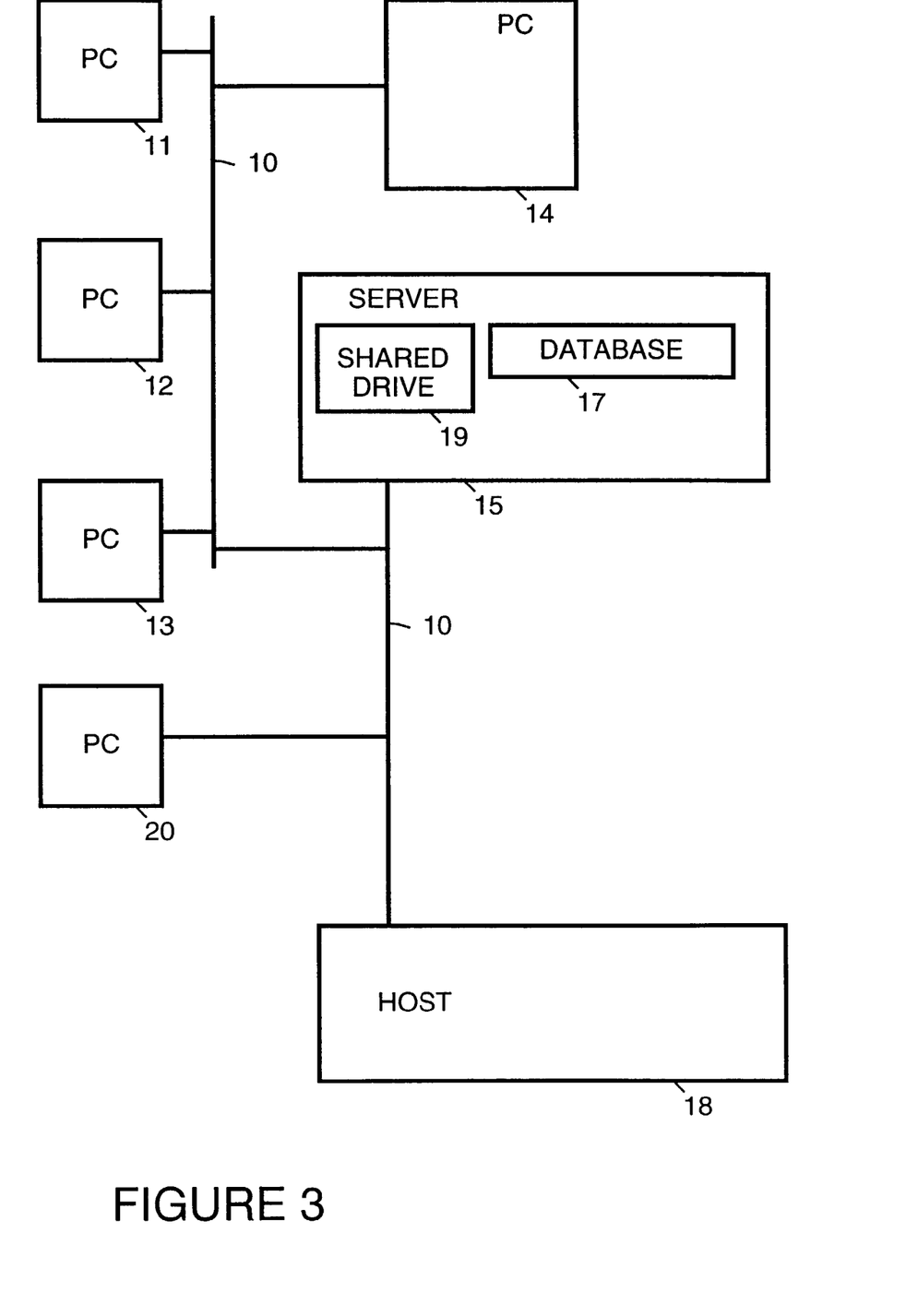
FIG. 3 is a simplified block diagram that shows the arrangement of a shared drive and a related database in accordance with an embodiment of the present invention.

FIG. 3 is a simplified block diagram that shows an example of the relative location of shared drive 19 and database 17. Shared drive 19 and database 17 are located within a server 15.

In the example shown in FIG. 3, each user can be located on their own personal computer (PC) connected to a network. This is illustrated in FIG. 3 by a personal computer 11, a personal computer 12, a personal computer 13 and a personal computer 14 connected to a local area network (LAN)/wide area network (WAN) 10.

LAN/WAN 10 can be any combination of LAN and/or WAN segments. For example, LAN/WAN 10 can consist solely of a local area network. Alternatively, LAN/WAN 10 can consist solely of a wide area network, such as the Internet. Alternatively, LAN/WAN 10 can include one or more LAN segments and one or more WAN segments.

Link update routine 47 (shown in FIG. 1) is located, for example in server 15 or in another entity on LAN/WAN 10. Link update 47 is run periodically, for example, once per day. Alternatively, link update 47 may be run at other times, for example, upon detection of any operation that changes file content of database 17. When run, link update routine 47 needs access to database 17 in order to check to determine to which files within database 17 each user has editable access. Link update 47 also needs access to shared drive 19 to update symbolic links within the directory structures for each user.

In one embodiment, database 17 provides for access by all who are desired to have editing capability on a worldwide basis via file uploading while maintaining access control. This is represented in FIG. 3 by a personal computer 20 having access to server 15. This access could be, for example, through the internet or some other network. Host 18 represents another network site available via LAN/WAN 10. For example, host 18 is a web host on the world wide web. Alternatively, host 18 is a host on another network system. Users with access to server 15 via LAN/WAN 10 can directly edit files within database 17. This is done in a manner transparent to the user by shared drive 19. While not necessary in all embodiments, in a preferred embodiment, server 15 provides for immediate network publishing of the latest version of each file within database 17.

Flexible viewing and editing control is provided. Account manager 49 (FIG. 1) creates file locking so that only one editor can control a file at a time while others have read-only capability, and also imposes uniform directory structures and indexing information for all files. In one embodiment, Samba is used for account manager 49, although other programs could be used in different embodiments. Account manager 49 directs that different connecting clients must specify lock requests for files, thereby preventing the system from allowing simultaneous editing of a file. Account manager 49 can further restrict read access to a file.

The ability to publish to the network is incorporated as an integral single step (one mouse click) provided server 15 is enabled to automatically make files available over a network, for example, the world wide web. The use of an appropriate host implementation of database 17 supports automatically retaining a set of historic files as revisions are made.

Using the architecture set out in FIG. 3, users no longer endure the inefficiencies of uploading and downloading files in order to publish to the world wide web, or another network. Users easily find and revise the latest version of files being updated by multiple authors. Access and editing control are integrated with each publication. Indexing of published content consistently occurs. No separate web publishing step is required as with traditional shared drives. Users are able to access earlier versions of files they are modifying.

In the preferred embodiment shown in FIG. 3, users can access via shared drive 19 only files they can edit. However, a larger set of the files (or even all the files) within database 17 can be published by server 15 allowing read access to every user, for example, through the use of a standard web browser.

Figure 4:
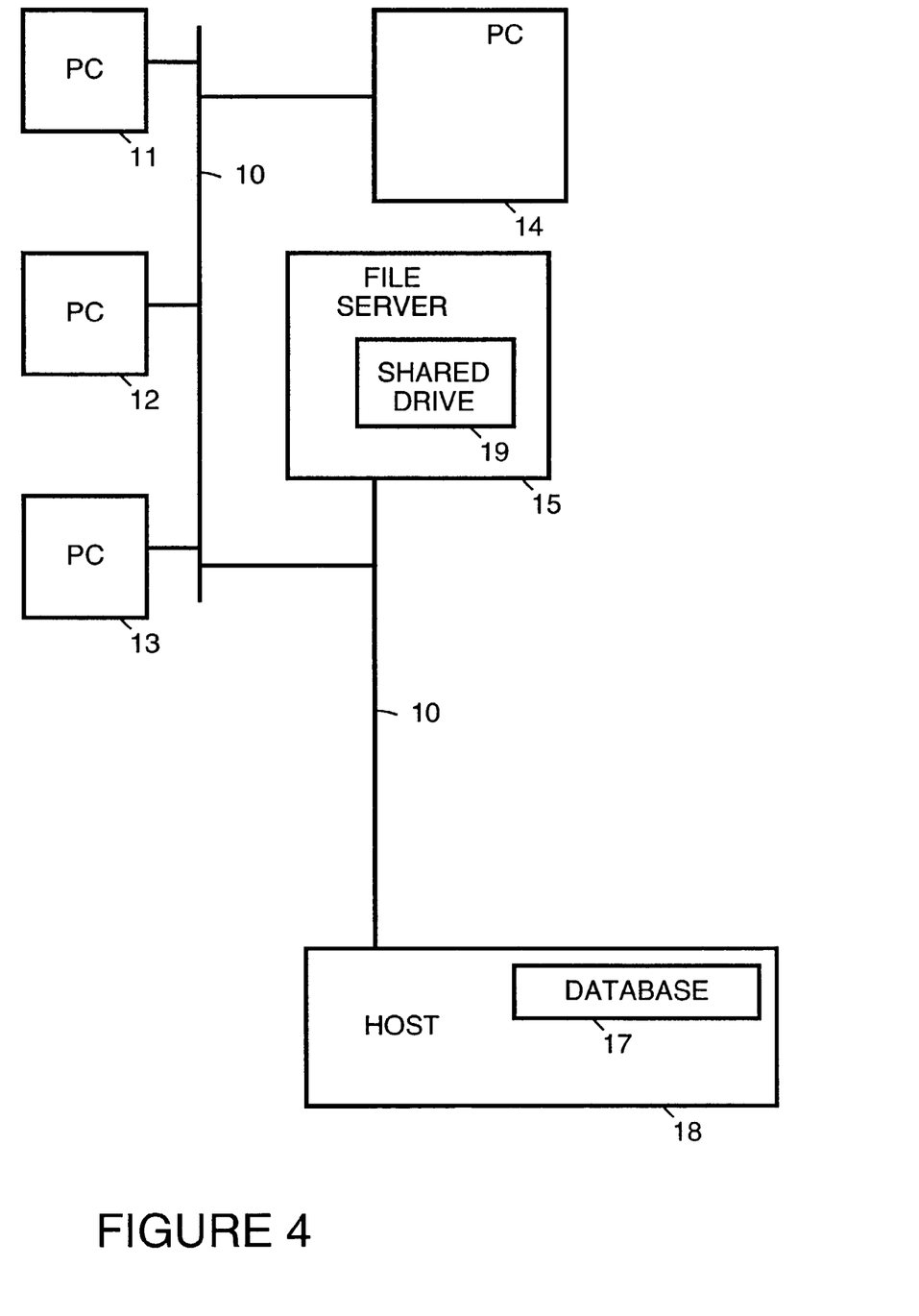
FIG. 4 is a simplified block diagram that shows the arrangement of a shared drive and a related database in accordance with an embodiment of the present invention.

FIG. 4 is a simplified block diagram that shows another example of the relative location of shared drive 19 and database 17. Shared drive 19 is located within a file server 15. Database 17 is located on host 18 which server 15 can access through LAN/WAN 10. Link update routine 47 (shown in FIG. 1) can be located, for example in server 15 or in host 18. When run, link update routine 47 needs access to database 17 in host 18 and shared drive 19 within file server 15.

Figure 5:
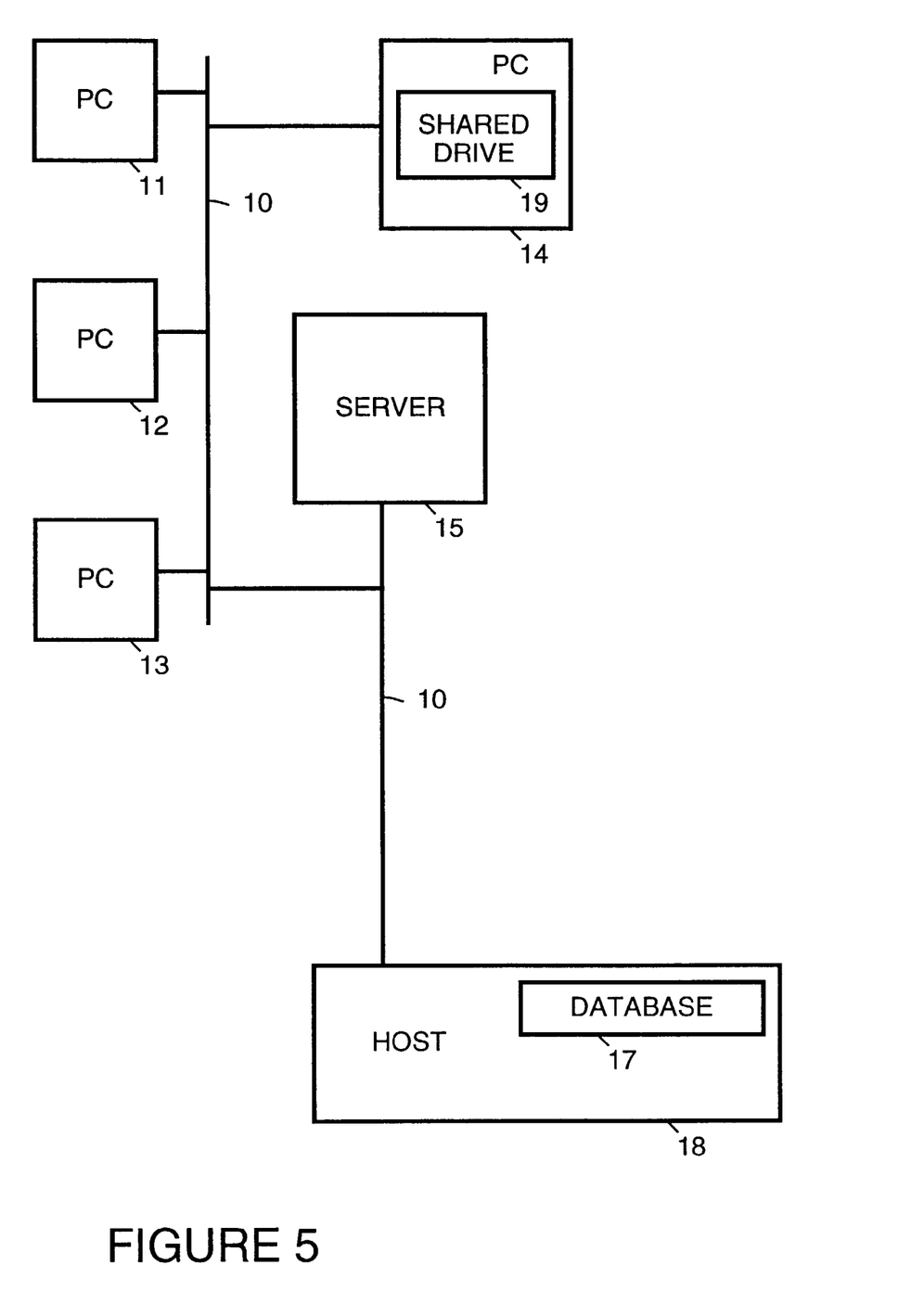
FIG. 5 is a simplified block diagram that shows the arrangement of a shared drive and a related database in accordance with an embodiment of the present invention.

FIG. 5 is a simplified block diagram that shows another example of the relative location of shared drive 19 and database 17. Shared drive 19 is located within personal computer 14. Database 17 is located on host 18 which server 15 can access through LAN/WAN 10. Link update routine 47 (shown in FIG. 1) can be located, for example in personal computer 14, server 15 or in host 18. When run, link update routine 47 needs access to database 17 in host 18 and shared drive 19 within personal computer 14.

Other combinations are possible as well. For example, either or both of shared drive 19 and database 17 can be located in any of personal computer 11, personal computer 12a personal computer 13, personal computer 14 or server 15.

Figure 6:
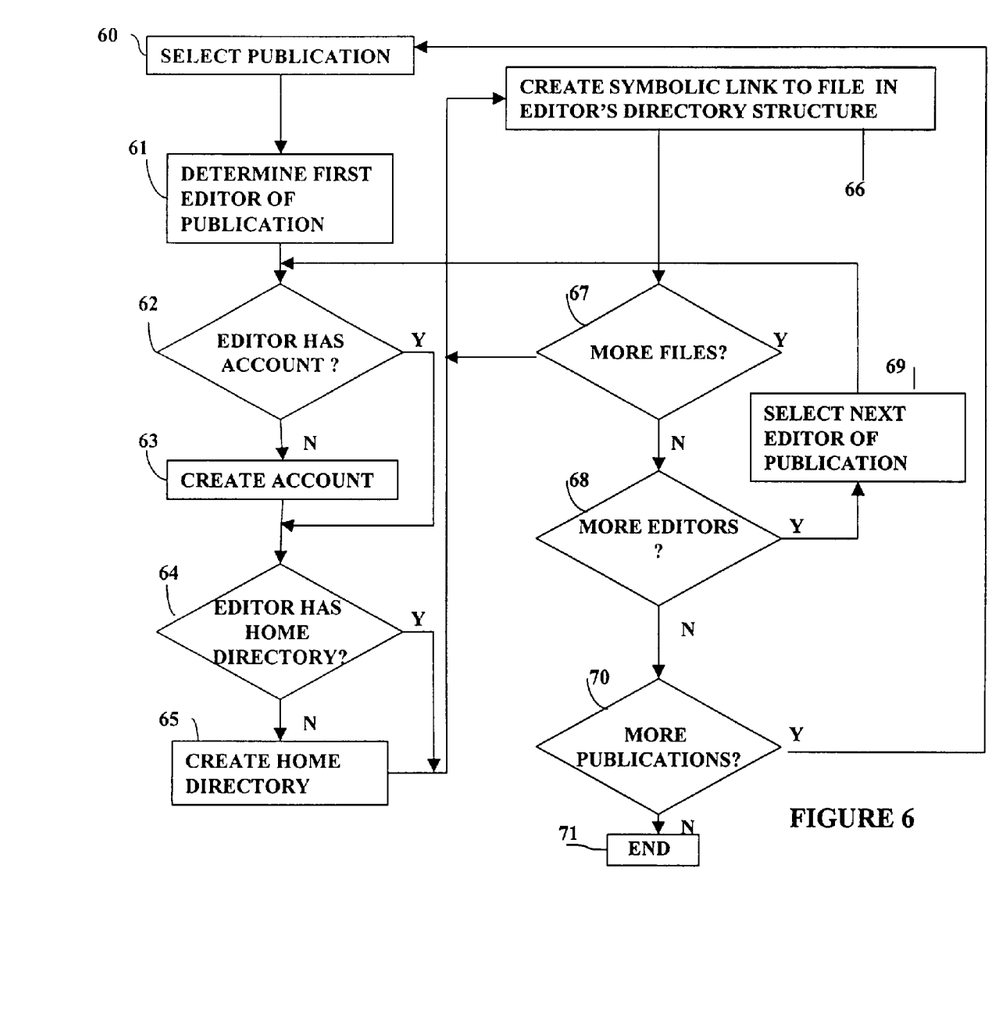
FIG. 6 is a simplified block diagram that shows the link update routine in accordance with an embodiment of the present invention.

FIG. 6 is a simplified block diagram that shows link update routine 47 (FIG. 1) in accordance with an embodiment of the present invention. Link update routine 47 starts by selecting a publication containing one or more files in block 60. Block 61 determines the identity of the first user of the publication with edit capability, also referred to as an "editor". Block 62 asks if the editor already has an account on the system. If not, an account is created for the editor in block 63. If so, block 63 is skipped, and block 64 asks if the editor already has a home directory. If block 64 is answered negatively, block 65 creates a home directory for the editor. If block 64 is answered affirmatively, block 65 is skipped.

Block 66 creates a symbolic link to the file from the publication to process. If so, flow of control returns to block 66 to create further symbolic links. If not, block 68 checks to see if there are more editors to process for this publication. If so, block 69 selects the next editor of the publication, and flow of control returns back to block 62 to check to see if this new editor has an account. If block 68 is answered negatively, block 70 checks to see if there are more publications to process. If so, flow of control returns to block 60 to select a new publication. If not, link update routine 47 ends in block 71.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system comprising:
   a database, the database including a plurality of files and access information, the access information indicating which users have edit access to which files in the database;
   a shared drive, the shared drive containing for each user of the shared drive a directory structure that includes symbolic links to any files in the database to which files at least one of the users has edit access, wherein the shared drive is separate from the database and does not contain the plurality of files, but only contains symbolic links to files within the plurality of files to which files at least one of the users has edit access; and
   a link update routine that scans the access information in the database and updates the symbolic links in the shared drive to take into account any changes made to the access information.

2. The system of claim 1:
   wherein the shared drive includes an account management function that prevents each user of the shared drive from seeing directory structures for other users of the shared drive.

3. The system of claim 1:
   wherein the shared drive is located on a server accessible to a user on a personal computer via a local area network; and
   wherein the database is located on a web host, which is not part of the server, but is accessible to the server via an internet connection.

4. The system of claim 1:
   wherein the shared drive is located on a first personal computer accessible to a user on another personal computer via a local area network; and
   wherein the database is located on a web host, which is not part of the first personal computer but is accessible to the first personal computer via an internet connection to a server on the local area network.

5. The system of claim 1:
   wherein the shared drive and the database are located within a single computer system.

6. A computer implemented method for providing shared access to a plurality of files, the method comprising:
   (a) storing the plurality of files in a database;
   (b) storing in the database access information, the access information indicating which users have edit access to which files in the database;
   (c) storing in a shared drive, a separate directory structure for each user of the shared drive, each separate directory structure for an associated user including symbolic links to any files in the database to which files the associated user has edit access, wherein the shared drive is separate from the database and does not contain the plurality of files, but only contains symbolic links to files within the plurality of files; and
   (d) scanning the access information in the database to detect changes in the access information, including:
   (d.1) updating the symbolic links in the shared drive to take into account any detected changes made to the access information.

7. The computer implemented method of claim 6:
   wherein in (c) the directory structure on the shared drive appears to the user within a virtual drive.

8. The computer implemented method of claim 6:
   wherein (c) includes:
      locating the shared drive on a server accessible to a user on a personal computer via a local area network; and
   wherein (b) includes:
      the database on a web host, which is not part of the server, but is accessible to the server via an internet connection.

9. The computer implemented method of claim 6:
   wherein (c) includes:
      locating the shared drive on a personal computer accessible to the user on another personal computer via a local area network; and
   wherein (b) includes:
      locating the database on a web host, which is not part of the personal computer but is accessible to the personal computer via an internet connection.

10. The computer implemented method of claim 6:
    wherein (c) includes:
       locating the shared drive on a first computing system; and
    wherein (b) includes:
       locating the database on the first computing system.

11. Storage media that stores computer readable programming code which, when executed by a computing system, implements a system comprising:
    a database, the database including a plurality of files and access information, the access information indicating which users have edit access to which files in the database;
    a plurality of data structures for use within a shared drive, the shared drive containing for each user of the shared drive a directory structure that includes symbolic links to any files in the database to which files the user has edit access, wherein the shared drive is separate from the database and does not contain the plurality of files, but only contains symbolic links to files within the plurality of files; and
    a link update routine that scans the access information in the database and updates the symbolic links in the shared drive to take into account any changes made to the access information.

12. The storage media of claim 11: wherein the system additionally comprises:
    an account management function that prevents each user of the shared drive from seeing directory structures for other users of the shared drive.

13. The storage media of claim 11: wherein the system additionally comprises:
    an account management function that prevents simultaneous editing of one of said plurality of files.

14. A computer system for providing shared access to a plurality of files, the system comprising:
    (a) means for storing the plurality of files in a database;
    (b) means for storing in the database access information, the access information indicating which users have edit access to which files in the database;
    (c) means for storing in a shared drive, a separate directory structure for each user of the shared drive, each separate directory structure for an associated user including symbolic links to files in the database to which files the associated user has edit access, wherein the shared drive is separate from the database and does not contain the plurality of files, but only contains symbolic links to files within the plurality of files to which files at least one user has edit access; and (d) means for scanning the access information in the database to detect changes in the access information, including:

(d.1) means for updating the symbolic links in the shared drive to take into account detected changes made to the access information.

\* \* \* \* \*